(12) United States Patent
McCauley

(10) Patent No.: US 10,824,303 B1
(45) Date of Patent: Nov. 3, 2020

(54) IMAGE CAPTURE DEVICE CONTROLS

(71) Applicant: GoPro, Inc., San Mateo, CA (US)

(72) Inventor: Grant Adam McCauley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/415,536

(22) Filed: May 17, 2019

(51) Int. Cl.
  *G06F 3/0482* (2013.01)
  *H04N 5/232* (2006.01)
  *H04N 5/225* (2006.01)

(52) U.S. Cl.
  CPC ....... *G06F 3/0482* (2013.01); *H04N 5/22525* (2018.08); *H04N 5/23216* (2013.01)

(58) Field of Classification Search
  CPC .............. G06F 3/0482; H04N 5/22525; H04N 5/23216
  See application file for complete search history.

(56) References Cited

U.S. PATENT DOCUMENTS

| | | | | |
|---|---|---|---|---|
| 9,819,857 B2* | 11/2017 | Miyajima | ........... | G06F 3/04845 |
| 10,015,308 B2* | 7/2018 | Cho | ........ | G06F 3/0488 |
| 10,542,215 B2* | 1/2020 | Kunishige | ........... | G06F 3/04847 |
| 2008/0307329 A1* | 12/2008 | Endoh | ................. | G03G 15/5075 |
| | | | | 715/762 |
| 2010/0033614 A1* | 2/2010 | Yoo | ......... | H04N 5/907 |
| | | | | 348/333.02 |
| 2011/0063236 A1* | 3/2011 | Arai | .................... | H04N 5/23216 |
| | | | | 345/173 |
| 2012/0137236 A1* | 5/2012 | Abe | ..... | G06F 3/04847 |
| | | | | 715/763 |
| 2016/0124917 A1* | 5/2016 | Ducat | ..................... | G06F 9/451 |
| | | | | 715/760 |
| 2016/0191800 A1* | 6/2016 | Yoshikawa | ........ | H04N 5/23245 |
| | | | | 348/220.1 |
| 2016/0224225 A1* | 8/2016 | Kondo | ................. | G06F 3/04817 |
| 2016/0227105 A1* | 8/2016 | Kobayashi | .......... | G06F 3/04847 |
| 2018/0121057 A1* | 5/2018 | Liang | ..................... | G06F 21/36 |

* cited by examiner

*Primary Examiner* — Timothy J Henn
(74) *Attorney, Agent, or Firm* — Esplin & Associates, PC

(57) ABSTRACT

An image capture device may include a display for presenting controls. The controls may be used by a user to operate the image capture device in capturing visual content. A control customization interface may include interface feature(s) that enables selection of one or more selectable controls for inclusion in a set of controls. Based on user interaction with the control customization interface, the set of controls may be determined and presented on the display.

20 Claims, 11 Drawing Sheets display 400 display 400 display 600 display 600

IMAGE CAPTURE DEVICE CONTROLS

FIELD

This disclosure relates to presenting controls of image capture device used to capture visual content.

BACKGROUND

A display of an image capture device may include a limited amount space to display controls. Default controls presented on the display may not be used by some users and may obstruct views (e.g., preview) of visual content on the display. Different users may find different controls useful for capturing visual content.

SUMMARY

This disclosure relates to image capture device controls. A control customization interface may be presented on a display of an image capture device. The control customization interface may include one or more interface features that enables selection of one or more of selectable controls for inclusion in a set of controls. The selectable controls may include a first selectable control, a second selectable control different from the first selectable control, and/or other selectable controls. User interaction with the control customization interface may be determined. The set of controls may be determined based the user interaction with the control customization interface and/or other information. The set of controls may include the first selectable control based on the user interaction with the control customization interface indicating user selection of the first selectable control and may not include the second selectable control based on the user interaction with the control customization interface not indicating user selection of the second selectable control. The set of controls may be presented on the display. Visual content may be captured based on user interaction with the set of controls.

An image capture device that capture visual content may include one or more of a housing, an electronic storage, a processor, an optical element, an image sensor, a display, and/or other components. One or more components of the image capture device may be carried by the housing. For example, the optical element(s), the image sensor(s), and/or the display(s), may be carried by the housing of the image capture device. The housing may carry other components, such as the processor(s) and/or the electronic storage(s).

An electronic storage may store visual information defining visual content, information relating to visual content, information relating to control customization interface, information relating to interface features, information relating to selectable controls, information relating to selection of selectable control(s), information relating to user interaction with control customization interface, information relating to set of controls, information relating to user interaction with the set of controls, information relating to capture of visual content, and/or other information.

An optical element may be configured to guide light within a field of view to an image sensor. An image sensor may be configured to generate a visual output signal based on light that becomes incident thereon. The visual output signal may convey visual information that defines visual content having the field of view. A display may be configured to present one or more sets of controls for controlling the capture of visual content. The display may include one or more touchscreen displays and/or other displays.

A processor may be configured by machine-readable instructions. Executing the machine-readable instructions may cause the processor(s) to facilitate presenting controls for capturing visual content. The machine-readable instructions may include one or more computer program components. The computer program components may include one or more of a customization component, a user interaction component, a controls component, a presentation component, a capture component, and/or other computer program components.

The customization component may be configured to present a control customization interface and/or other information on the display(s). The control customization interface may include one or more interface features. The control customization interface may include one or more interface features that enables selection of one or more of selectable controls for inclusion in the set(s) of controls. The selectable controls may include a first selectable control, a second selectable control different from the first selectable control, and/or other selectable controls.

In some implementations, the interface feature(s) of the control customization interface that enables the selection of one or more of the selectable controls for inclusion in the set(s) of controls may include one or more toggle features. The control customization interface/the toggle feature(s) may enable a user to toggle individual ones of the selectable controls between being selected and not being selected for inclusion in the set(s) of controls.

In some implementations, the interface feature(s) of the control customization interface that enables the selection of one or more of the selectable controls for inclusion in the set(s) of controls may include one or more drag and drop features. The control customization interface/the drag and drop feature(s) may enable a user to drag and drop individual ones of the selectable controls onto one or more selection areas to select the individual ones of the selectable controls for inclusion in the set(s) of controls.

In some implementations, the control customization interface may further include one or more interface features that enables positioning on the display(s) of selectable control(s) selected for inclusion in the set(s) of control.

In some implementations, the control customization interface may further include one or more interface features that enables changing one or more appearances on the display(s) of selectable control(s) selected for inclusion in the set(s) of control. The appearance(s) of selectable control(s) selected for inclusion in the set(s) of control may include one or more of an icon, a size, a color, a summary, and/or other visual aspect of selectable control(s) selected for inclusion in the set of control.

In some implementations, the selectable controls may include one or more capture setting controls. A capture setting control may enable usage of one or more capture settings. A capture setting may define one or more aspects of operation for the image capture device, a processor of the image capture device, an image sensor of the image capture device, an optical element of the image capture device, and/or other components of the image capture device. The appearance of a capture setting may be determined based on one or more types of operations defined by the capture setting and/or other information.

The user interaction component may be configured to determine user interaction with the control customization interface. Determination of user interaction with the control customization interface may include determination of user interaction with and/or via one or more interface features of the control customization interface. For example, user interaction with the control customization interface may be determined based on a user's usage of one or more of the interface feature(s) of the control customization interface.

The controls component may be configured to determine the set(s) of controls based the user interaction with the control customization interface and/or other information. The set(s) of controls may include one or more selectable controls indicated by the user interaction to be selected for inclusion in the set(s) of controls. For example, the set(s) of controls may include the first selectable control based on the user interaction with the control customization interface indicating user selection of the first selectable control. The set(s) of controls may not include the second selectable control based on the user interaction with the control customization interface not indicating user selection of the second selectable control.

In some implementations, the selection of one or more of the selectable controls for inclusion in the set(s) of controls may be stored as a display mode on the image capture device. Usage of the display mode may include presentation of the set of controls including the selectable control(s) previously selected for inclusion in the set of control.

The presentation component may be configured to present the set(s) of controls and/or other information on the display(s). In some implementations, a preview of the visual content may be presented on the display(s). The preview of the visual content may be presented prior to capture of the visual content and/or during the capture of the visual content. The set(s) of controls may be presented within one or more portions of the display(s) while the preview of the visual content may be presented on other portion(s) of the display(s) so that they do not overlap. The set(s) of controls may be overlaid over the preview of the visual content.

The capture component may be configured to capture the visual content based on user interaction with the sets of controls and/or other information. Capture of the visual content based on user interaction with the set(s) of controls may include capture of the visual content based on user interaction with the set(s) of controls indicating when, where, what, and/or how the visual content should be captured.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
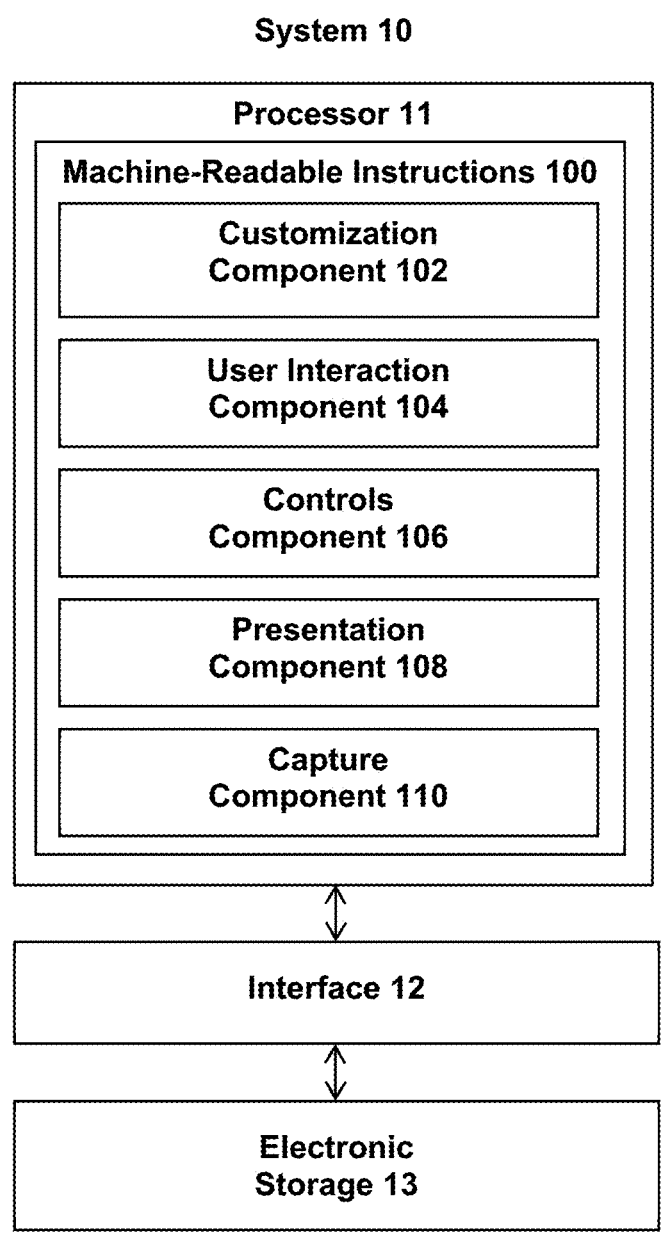
FIG. 1 illustrates an example system that presents controls for capturing visual content.

FIG. 1 illustrates a system 10 for presenting controls for capturing visual content. The system 10 may include one or more of a processor 11, an interface 12 (e.g., bus, wireless interface), an electronic storage 13, and/or other components. In some implementations, the system 10 may include one or more optical elements, one or more image sensors, one or more displays, and/or other components. A control customization interface may be presented on the display(s). The control customization interface may include one or more interface features that enables selection of one or more of selectable controls for inclusion in a set of controls. The selectable controls may include a first selectable control, a second selectable control different from the first selectable control, and/or other selectable controls. User interaction with the control customization interface may be determined. The set of controls may be determined based the user interaction with the control customization interface and/or other information. The set of controls may include the first selectable control based on the user interaction with the control customization interface indicating user selection of the first selectable control and may not include the second selectable control based on the user interaction with the control customization interface not indicating user selection of the second selectable control. The set of controls may be presented on the display(s). Visual content may be captured based on user interaction with the set of controls.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to control customization interface, information relating to interface features, information relating to selectable controls, information relating to selection of selectable control(s), information relating to user interaction with control customization interface, information relating to set of controls, information relating to user interaction with the set of controls, information relating to capture of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting controls for capturing visual content. The machine-readable instructions 100 may include one or more computer program components. The machine-readable instructions 100 may include one or more of a customization component 102, a user interaction component 104, a controls component 106, a presentation component 108, a capture component 110, and/or other computer program components.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, image sensor(s), optical element(s), and display(s) of the system 10 may be carried by the housing of the image capture device. The housing may carry other components, such as one or more processors (e.g., the processor 11), and/or one or more electronic storages (e.g., the electronic storage 13).

Figure 3:
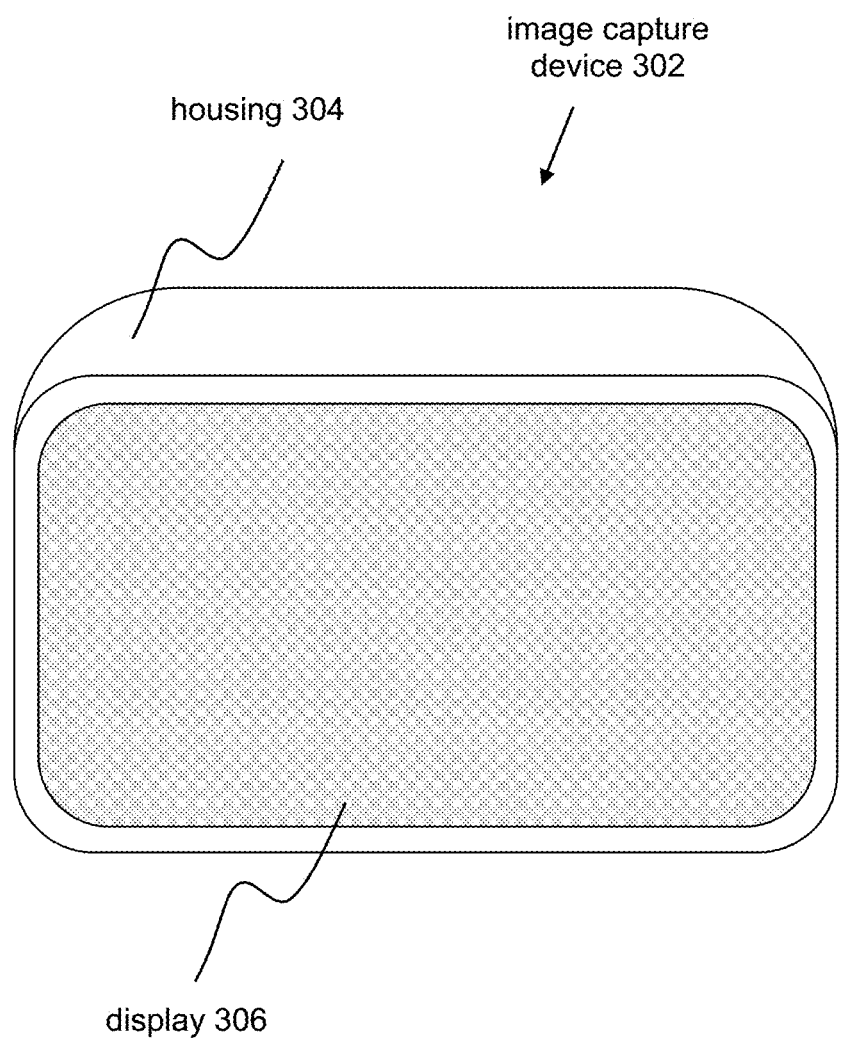
FIG. 3 illustrates an example image capture device.

An image capture device may refer to a device captures visual content. An image capture device may capture visual content in form of images, videos, and/or other forms. An image capture device may be a standalone device (e.g., camera) or may be part of another device (e.g., part of a smartphone). For example, an image capture device may refer to a camera and/or an image sensor. FIG. 3 illustrates an example image capture device 302. Visual content (e.g., of image(s), video frame(s)) may be captured by the image capture device 302. The image capture device 302 may include a housing 304, and the housing 304 may carry (be attached to, support, hold, and/or otherwise carry) one or more optical elements, one or more image sensors, one or more displays (e.g., a display 306), one or more processors, and/or other components. One or more components of the image capture device 302 may be the same as, be similar to, and/or correspond to one or more components of the system 10. Other configurations of image capture devices are contemplated.

A display (e.g., the display 306) of the image capture device 302 may be configured to present one or more sets of controls for controlling the capture of visual content by the image capture device 302. In some implementations, a display of the image capture device 302 may include a touchscreen display. A touchscreen display may be configured to receive user input via user engagement with the touchscreen display. A user may engage with the touchscreen display via interaction with one or more touch-sensitive surfaces/screens and/or other components of the touchscreen display. For example, a user may provide different inputs to the image capture device 302 via one or more of tapping, pressing, touching and holding, and/or moving one or more fingers, one or more stylus, and/or other apparatus along a touch-sensitive surface/screen of the touchscreen display.

A display may be used to present visual content (of images, of videos) captured by the image capture device 302. A display may be used to present previews of visual content captured or to be captured by the image capture device 302. For example, the image capture device 302 may be used to capture a video, and the display may be used to present a preview of the video being captured. The preview of the video may be presented during capture of the video. That is, while the image capture device 302 is recording the video, the preview of the video being recorded/saved may be presented on the display. As another example, the image capture device 302 may be used to capture an image, and the display may be used to present a preview of the image that may be captured. The preview of the image may be presented before capture of the image. That is, while the image capture device 302 is being pointed in a particular direction, the preview of the image that may be taken/saved may be presented on the display.

In some implementations, one or more set of controls may be presented within one or more portions of the display(s) while the preview of the visual content may be presented on other portion(s) of the display(s) so that they do not overlap. In some implementations, one or more sets of controls may be presented as an overlay over the preview of the visual content. That is, the set(s) of controls may be overlaid over the preview of the visual content.

An optical element of the image capture device 302 may include instrument(s), tool(s), and/or medium that acts upon light passing through the instrument(s)/tool(s)/medium. For example, the optical element may include one or more of lens, mirror, prism, and/or other optical elements. The optical element may affect direction, deviation, and/or path of the light passing through the optical element. The optical element may have a field of view. The optical element may be configured to guide light within the field of view to an image sensor. The field of view may include the field of view of a scene that is within the field of view of the optical element and/or the field of view of the scene that is delivered to the image sensor. For example, the optical element may guide light within its field of view to the image sensor or may guide light within a portion of its field of view to the image sensor. The field of view of the optical element may refer to the extent of the observable world that is seen through the optical element. The field of view of the optical element may include one or more angles (e.g., vertical angle, horizontal angle, diagonal angle) at which light is received and passed on by the optical element to the image sensor. In some implementations, the field of view may be greater than or equal to 180-degrees. In some implementations, the field of view may be smaller than or equal to 180-degrees.

An image sensor of the image capture device 302 may include sensor(s) that converts received light into output signals. The output signals may include electrical signals. The image sensor may generate output signals conveying information that defines visual content of one or more images and/or one or more video frames of a video. For example, the image sensor may include one or more of a charge-coupled device sensor, an active pixel sensor, a complementary metal-oxide semiconductor sensor, an N-type metal-oxide-semiconductor sensor, and/or other image sensors.

The image sensor may be configured to generate one or more visual output signals conveying visual information (defining visual content of images and/or videos) based on light that becomes incident thereon and/or other information. For example, the image sensor may be configured to generate a visual output signal based on light that becomes incident thereon during a capture duration. The visual output signal may convey visual information that defines visual content having the field of view.

A processor of the image capture device 302 may include one or more processors (logic circuitry) that provide information processing capabilities in the image capture device 302. The processor may provide one or more computing functions for the image capture device 302. The processor may operate/send command signals to one or more components of the image capture device 302 to operate the image capture device 302. For example, the processor may facilitate operation of the image capture device 302 in capturing image(s) and/or video(s), facilitate operation of the optical element (e.g., change how light is guided by the optical element 304), and/or facilitate operation of the image sensor (e.g., change how the received light is converted into information that defines images/videos and/or how the images/videos are post-processed after capture).

The processor may obtain information from the image sensor and/or other sensors of the image capture device 302, and/or facilitate transfer of information from the image sensor and/or other sensors to another device/component. The processor may be remote from the processor 11 or local to the processor 11. One or more portions of the processor may be part of or remote from the processor 11. One or more portions of the processor 10 may be part of or remote from the processor. The processor may include and/or perform one or more functionalities of the processor 11 shown in FIG. 1.

The processor may be configured to facilitate presentation of one or more sets of control on the display(s) of the image capture device 302. For example, the processor may facilitate presentation of a control customization interface on the display(s) of the image capture device 302. The processor may facilitate user interaction with the control customization interface. One or more sets of controls for the image capture device 302 may be determined based on the user interaction with the control customization interface. The set(s) of controls may be presented on the display(s) (e.g., the display 306) of the image capture device 302, and visual content may be captured by the image capture device 302 based on user interaction with the set(s) of controls.

With the miniaturization of image capture devices, the size of displays of image capture devices have become smaller. For example, the size of the display 306 of the image capture device 302 may be limited by the size of the housing 304. Limited space of the display 306 may allow only a limited number of controls to be presented on the display 306. For example, only a handful (e.g., 2-6) of controls may be presented on the display 306 before the display 306 appears crowded and/or the controls obscure too much of the preview presented on the display 306. Moreover, some users may not utilize the controls that may be presented on the display 306 as default. In such cases, valuable real estate of the display 306 may be taken up by unused controls.

By allowing users to select which controls are presented on the display 306, the present disclosure allows users to customize the on-screen controls to include the controls that are useful to them (e.g., meaningful to users, often used by users to capture visual content, provides useful control of the image capture device 302 to users for capturing visual content). Users may save selection of different controls for presentation on the display 306 as different presets. For example, different sets of controls may be saved as presets for controls to be presented when capturing visual content of different activities and/or events (e.g., preset controls to be displayed when capturing visual content of a surfing activity may be different from preset controls to be displayed when capturing visual content of a skiing activity).

Visual content may refer to content of one or more images and/or one or more videos that may be consumed visually. Visual content may be generated based on light received within a field of view of a single image sensor or within fields of view of multiple image sensors during a capture period. For example, visual content may refer to content of one or more images and/or one or more video frames of a video. The video frame(s) may define the visual content of the video. That is, video may include video frame(s) that define the visual content of the video. Video frame(s) may define visual content viewable as a function of progress through the progress length of the video. The progress length of the video may correspond to a length for which the video is presented. The progress length of the video may be measured in terms of time duration, frame numbers, and/or other ways. A video frame may include an image of the video at a moment within the progress length of the video.

In some implementations, visual content may include one or more of spherical visual content, virtual reality content, and/or other visual content. Spherical visual content and/or virtual reality content may include visual content viewable from one or more points of view as a function of progress through the progress length of the spherical/virtual reality visual content.

In some implementations, one or more steps/functionalities of the present disclosure may take place local to and/or remote from the image capture device 302. For example, a control customization interface may be presented on the display 306 to enable a user of the image capture device 302 to customize what and/or where controls may be presented on the display 306. As another example, the control customization interface may be presented on a display of a mobile device (e.g., smartphone, tablet) to enable a user of the mobile device 3 to customize what and/or where controls may be presented on the display 306. For instance, a user may user a mobile device to determine the set on controls to be presented on the display 306, and the mobile device may upload a user's customized setting for the controls to the image capture device 302.

Referring back to FIG. 1, the customization component 102 may be configured to present a control customization interface and/or other information. A control customization interface may refer to an interface (e.g., graphical user interface) through which a user may interact with a computing device, such as the system 10, to customize one or more controls presented on display(s) of an image capture device. A control customization interface may include one or more visual representations (e.g., icons, menus, graphics) to display information and/or user controls. A control customization interface may be presented on one or more displays. In some implementations, a display may include a touch-screen display.

The control customization interface may include one or more interface features. An interface feature may refer to a part, an attribute, a characteristic, and/or a property of the control customization interface that allows a user to interact with one or more visual representations on the control customization interface. For example, an interface feature may include one or more visual representations that may be selected by a user, changed by a user, positioned by a user, and/or otherwise interacted by a user. The control customization interface may include one or more interface features that enables selection of one or more selectable controls for inclusion in the set(s) of controls. For example, an interface feature may allow a user to interact with one or more visual representations on the control customization interface to select one or more of selectable controls for inclusion in the set(s) of controls to be presented on display(s) of an image capture device.

Selectable controls may refer to controls that may be selected through the control customization interface for presentation on display(s) of an image capture device. A control may refer to an interface element which may be interacted on by a user to determine operation of an image capture device. A control may be interacted (e.g., engaged by, manipulated by, touched by) on by a user to set and/or change operation of an image capture device at a time, over a duration of time, at a location, and/or over a range of locations. For example, selectable controls may include one or more of single image capture control, burst image capture control, time-lapse capture control, video capture control, image resolution control, framerate control, capture mode control, zoom control, image projection control, ISO control, shutter speed control, video stabilization control, focus control, information display control, white balance control, color control, contrast control, brightness control, flash control, lens-type simulation control, and/or other controls. Other types of control are contemplated.

The control customization interface may present the selectable controls (e.g., visual representations of the controls, descriptions of the controls) on one or more displays to facilitate a user's selection/non-selection of one or more selectable controls for inclusion in the set(s) of controls. The selectable controls presented on the control customization interface may include different types of selectable control. For example, the selectable controls may include a first selectable control, a second selectable control different from the first selectable control, and/or other selectable controls.

Figure 4A:
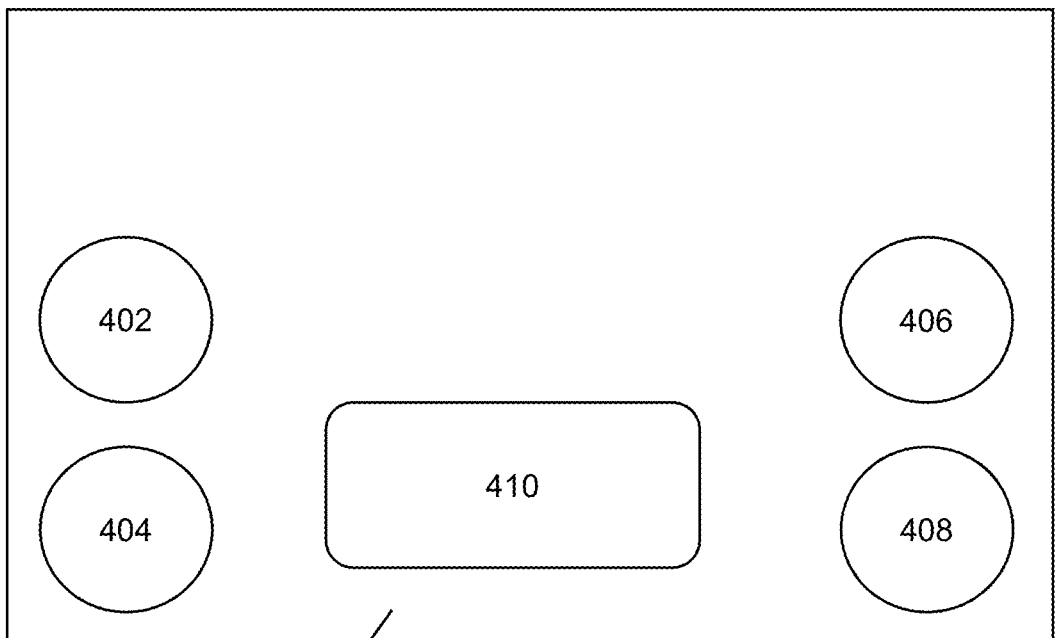
FIGS. 4A-4B illustrate example controls presented on a display.
Figure 4B:

For example, FIGS. 4A-4B illustrate example controls presented on a display 400 (e.g., of an image capture device). In FIG. 4A, controls 402, 404, 406, 408 may be presented on the display 400. In FIG. 4B, the controls 404, 408 may be presented on the display 400. The difference between the controls presented on the display 400 may be due to user selection of controls through the control customization interface. For instance, the arrangement of the controls 402, 404, 406, 408 presented on the display 400 in FIG. 4A may correspond to a default control scheme and/or a user-customized control scheme while the arrangement of the controls 404, 408 presented on the display 400 in FIG. 4A may correspond to a user-customized control scheme and/or a different user-customized control scheme. For example, a user may have initially interacted with the control customization interface to select the controls 404, 404, 406, 408 for inclusion in the set of controls presented on the display 400. The user may have then interacted with the control customization interface to select the controls 404, 408 for inclusion in the set of controls presented on the display 400. Other numbers of controls and other placements of controls are contemplated.

In some implementations, the display 400 may present other information. For example, referring to FIG. 4A, a portion 410 of the display 400 may present information relating to one or more capture settings of the image capture device. For example, the portion 410 of the display 400 may present information of current capture setting(s) of the image capture device (e.g., resolution, framerate, field of view). In some implementations, one or more portions of the display 400 that present information may operate as one or more controls. For example, the portion 410 of the display 400 may both present information relating to capture setting (s) of the image capture device and operate as a capture setting control (a control to select/modify capture setting(s) of the image capture device).

Figure 5A:
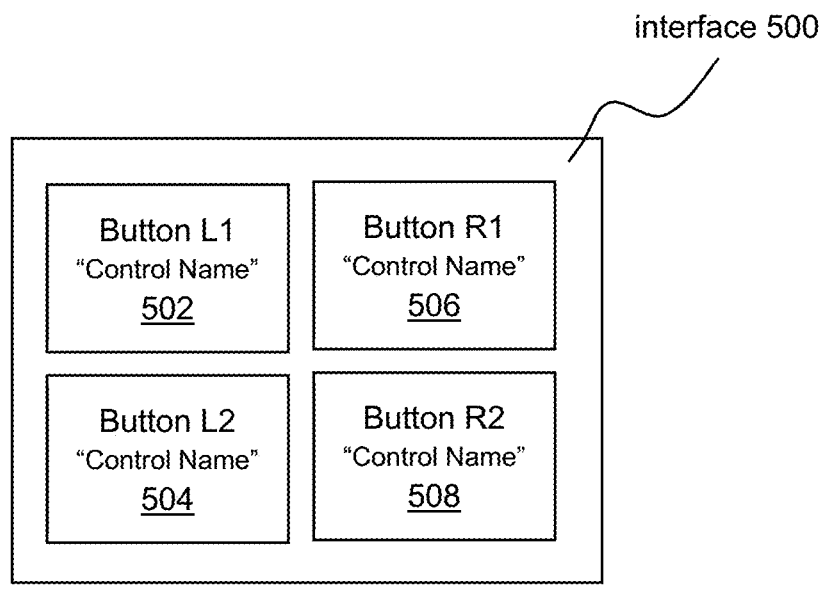
FIGS. 5A-5D illustrate example interfaces for selecting controls for presentation.

FIGS. 5A-5D illustrate example interfaces for selecting controls for presentation. FIG. 5A illustrates an example interface 500 for selecting controls for presentation. The interface 500 may include portions 502, 504, 506, 508. Individual portions 502, 504, 506, 508 may correspond to different positions of controls that may be presented on one or more display. For example, the portion 502 may correspond to an upper left control to be presented on a display (such as the control 402 shown in FIG. 4A), the portion 504 may correspond to a lower left control to be presented on the display (such as the control 404 shown in FIG. 4A), the portion 506 may correspond to a upper right control to be presented on the display (such as the control 406 shown in FIG. 4A), and the portion 508 may correspond to a lower right control to be presented on the display (such as the control 408 shown in FIG. 4A).

A user may interact with one or more of the portions 502, 504, 506, 508 to select which (if any) of the selectable controls may be presented on the display. For example, based on a user's interaction with the portion 502, the interface 500 may provide one or more options for a user to select a control from among the selectable controls. For instance, based on a user's interaction with the portion 502, the interface 500 may present one or more menus from which the user may select a selectable control to be presented on a display as an upper left control. The interface 500 may provide information on the selected selectable control(s). For example, the portion 502 may provide information on the name of the selectable control selected as the upper left control.

A user's selection of a selectable control through one or more of the portions 502, 504, 506, 508 may cause a corresponding control to be presented on the display(s). For example, based on a user's selection of selectable controls for each of the portions 502, 504, 506, 508, four corresponding controls may be presented on the display(s) (such as the controls 402, 404, 406, 408 shown in FIG. 4A). A user's non-selection of a selectable control for one or more of the portions 502, 504, 506, 508 may cause no control to be presented in the corresponding location. For example, based on a user's selection of controls for the portions 504, 508 and the user's non-selection of selectable controls for the portions 502, 506, only two corresponding controls for the portions 504, 508 may be presented on the display(s) (such as the controls 404, 408 shown in FIG. 4B).

An interface feature of the control customization interface that enables the selection of one or more of the selectable controls for inclusion in the set(s) of controls may include one or more toggle features. A toggle feature may refer to an interface feature that allows a user to switch a selectable control between being selected and not being selected for inclusion within the set(s) of controls. The control customization interface/the toggle feature(s) may enable the user to toggle individual ones of the selectable controls between being selected and not being selected for inclusion in the set(s) of controls.

For example, the control customization interface may include one or more visual representations that may be interacted on by the user to switch between selection and non-selection of a selectable control for inclusion in the set(s) of controls. For instance, a toggle feature may be implemented as one or more toggle buttons included in the control customization interface, and the toggle button(s) may enable the user to toggle between selection and non-selection of a selectable control for inclusion in the set(s) of controls. A toggle button may be a button separate from other portions of the control customization interface (e.g., dedicated toggle button) and/or may be part of other portions of the control customization interface (e.g., part of a visual representation of a selectable control). A toggle feature may be implemented as one or more toggle menus included in the control customization interface. A toggle menu may include one or more options for the user to toggle between selection and non-selection of a selectable control for inclusion in the set(s) of controls.

Figure 5B:
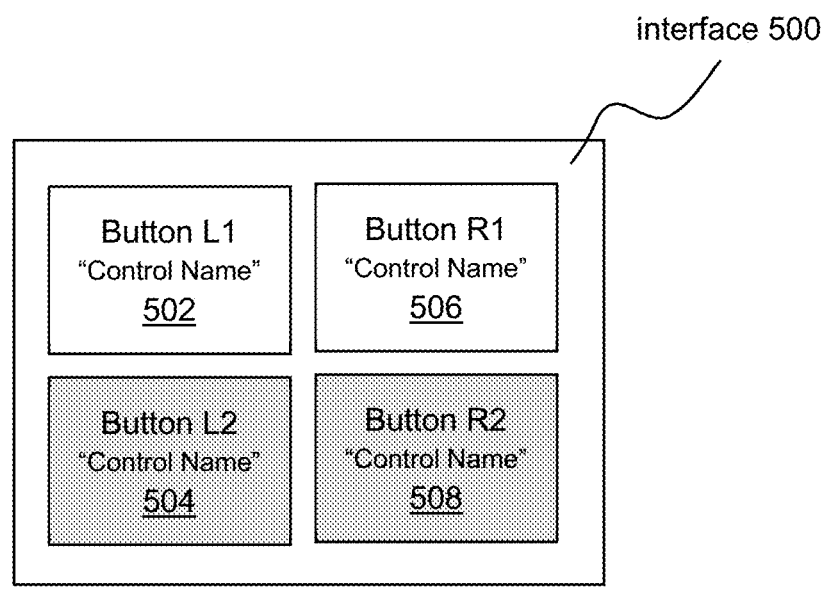

For example, referring to FIG. 5B illustrates a toggle feature of the interface 500. The interface 500 may include the portions 512, 514, 516, 518. The portions 512, 514, 516, 518 may correspond to controls presented at different locations on one or more display(s), and a user may assign different selectable controls to one or more of the portions 512, 514, 516, 518. Whether an assigned selectable control is selected for inclusion in the set(s) of controls (and therefore presented on the display(s)) may be determined based on the user's use of the toggle feature of the interface 500. For instance, the portions 512, 514, 516, 518 may individually act as a button which may be pressed/clicked by the user (e.g., using a cursor, using a finger on a touchscreen display). Such user engagement by the user may switch the selection/non-selection of the corresponding selectable control for inclusion in the set(s) of control for presentation on the display(s). The toggle feature of the interface 500 shown in FIG. 5B may enable the user to separately assign different selectable controls to different location on the display(s) and determine which of the assigned controls are selected/not-selected for inclusion in the set(s) of controls.

Figure 5C:
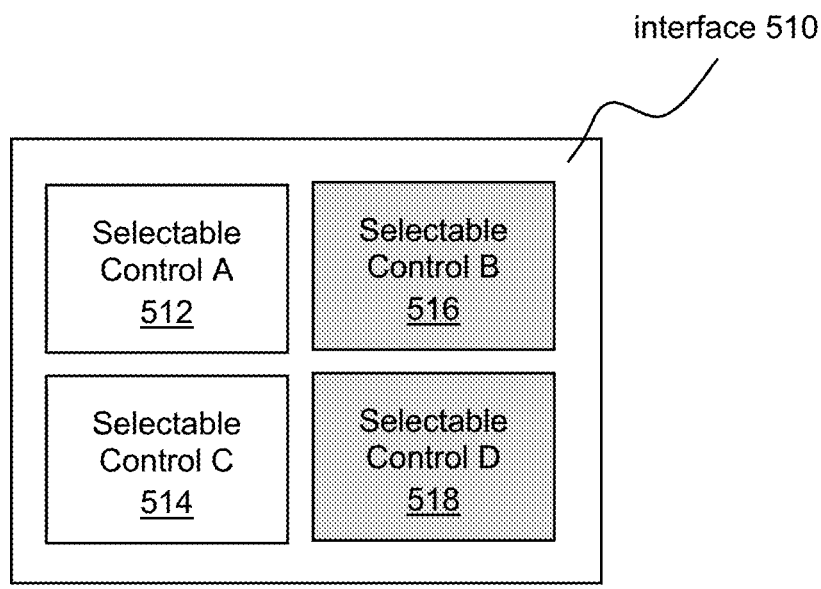

FIG. 5C illustrates an example interface 510 for selecting controls for presentation. The interface 510 may include portions 512, 514, 516, 518. Individual portions 512, 514, 516, 518 may correspond to different selectable controls. A toggle feature of the interface 510 may enable a user to interact with the portions 512, 514, 516, 518 and/or one or more parts of the portions 512, 514, 516, 518 to toggle between selection and non-selection of a selectable control for inclusion in the set(s) of controls. For instance, the portions 512, 514, 516, 518 may individually act as a button which may be pressed/clicked by the user (e.g., using a cursor, using a finger on a touchscreen display). Such user engagement by the user may switch the selection/non-selection of the different selectable control for inclusion in the set(s) of control for presentation on the display(s).

In some implementations, the control customization interface may provide information on whether a selectable control has or has not been selected for inclusions in the set(s) of controls. For example, one or more visual characteristics of the control customization interface and/or a selectable control presented on the control customization interface may be changed based on whether the selectable control has or has not been selected for inclusions in the set(s) of controls. For instance, referring to FIGS. 5B and 5C, based on user engaging with the portions 504, 508, 516, 518 to toggle-on the selection of the corresponding selectable controls for inclusion in the set(s) of controls, one or more visual characteristics of the portions 504, 508, 516, 518 may be changed (e.g., color and/or brightness changed).

An interface feature of the control customization interface that enables the selection of one or more of the selectable controls for inclusion in the set(s) of controls may include one or more drag and drop features. A drag and drop feature may refer to an interface feature that allows a user to move one or more visual representations within the control customization interface and allow the user to make a selection by releasing (dropping) the visual representation(s) at a particular location within the control customization interface. The control customization interface/the drag and drop feature(s) may enable the user to drag and drop individual ones of the selectable controls onto one or more selection areas to select the individual ones of the selectable controls for inclusion in the set(s) of controls. A selection area may refer to an area of a graphical user interface (e.g., the control customization interface) that allows the user to make a selection by placing one or more visual representations within the area. A selection area may be defined by a shape and/or a size.

Figure 5D:
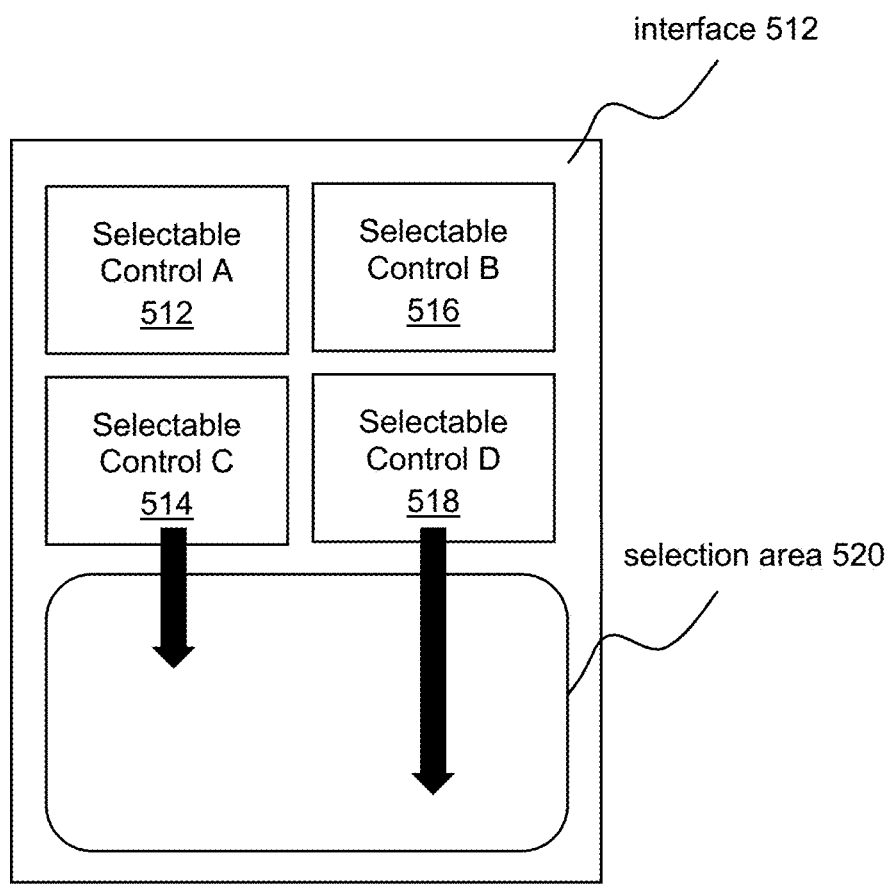

FIG. 5D illustrates an example interface 511 for selecting controls for presentation. The interface 512 may include portions 512, 514, 516, 518. Individual portions 512, 514, 516, 518 may correspond to different selectable controls. The interface 512 may include one or more selection areas (e.g., a selection area 520). In some implementations, a selection area may include one or more views of the display (s) on which the control(s) are to be presented. A drag and drop feature of the interface 512 may enable a user to drag and drop visual representations of the selectable controls on the selection area 520. For example, the user may move a visual representation of the selectable control C (shown in the portion 514) and a visual representation of the selectable control D (shown in the portion 518) to the selection area 520 (e.g., using a cursor, using a finger on a touchscreen display). Such interaction of the user with the interface 512 may select the selectable control C and the selectable control D for inclusion in the set(s) of control (and therefore presented on the display(s)).

In some implementations, the locations in which the visual representations of the selectable controls are dropped in the selection area 520 may determine the location of presentation of the selectable controls on the display(s). For example, based on the visual representation of the selectable control C being dropped in the upper left portion of the selection area 520, the selectable control C may be presented on upper left portion of a display (such as the control 402 shown in FIG. 4A). Based on the visual representation of the selectable control D being dropped in the lower right portion of the selection area 520, the selectable control D may be presented on lower right portion of a display (such as the control 408 shown in FIG. 4A). Other uses of the selection area 520 are contemplated.

In some implementations, the control customization interface may further include one or more interface features that enables positioning on the display(s) of selectable control(s) selected for inclusion in the set(s) of control (a positioning feature). The interface feature(s) may enable user to specify where the selected controls are presented on the display(s). The locations in which the selected controls are presented may be fixed and/or not fixed.

Figure 6A:
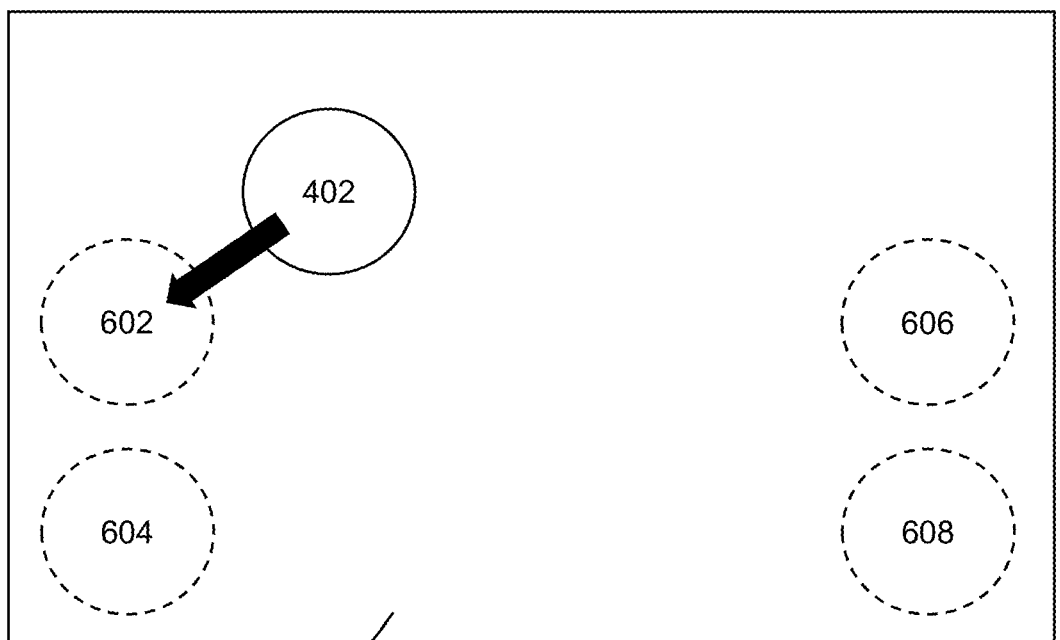
FIGS. 6A-6B illustrate example positionings of controls on a display.
Figure 6B:
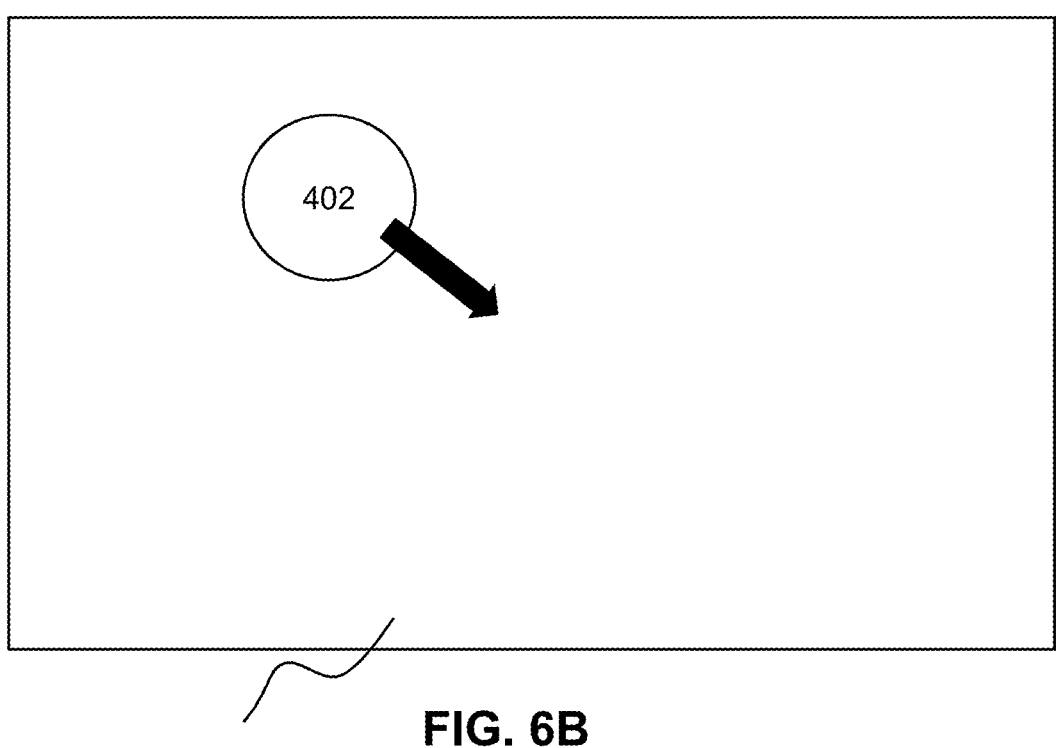

FIGS. 6A-6B illustrate example positionings of controls on a display 600. In FIG. 6A, a selectable control selected for inclusion in the set(s) of controls may be position within one of the positions 602, 604, 606, 608. The positions 602, 604, 606, 608 may define the fixed positions within which controls may be presented on the display 600. A user may specify which of the selected controls occupy which of the positions 602, 604, 606, 608, such as by moving a visual representation of the selected control (e.g., the control 402) into one of the positions 602, 604, 606, 608 (e.g., the position 602).

In FIG. 6B, a selectable control selected for inclusion in the set(s) of controls may be position within the display 600. There may not be any fixed positions that limit the positioning of the controls on the display 600. A user may specify any location (e.g., locations that allow for full presentation of the control) in the display 600 for presentation of a selected control (e.g., the control 402) by moving a visual representation of the selected control (e.g., the control 402) into the desired location.

Figure 6C:
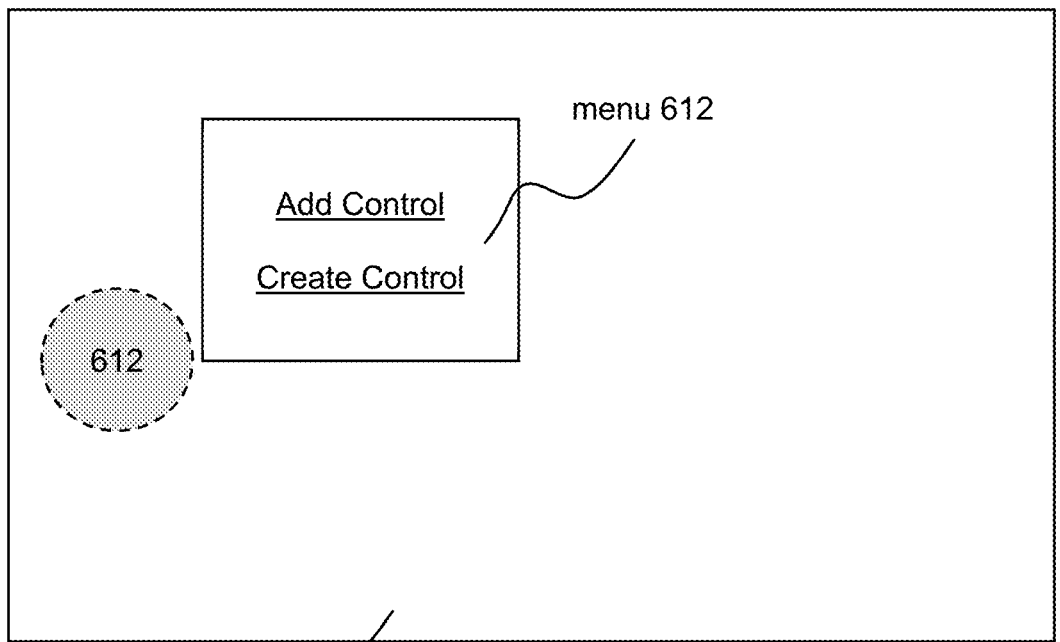
FIGS. 6C-6E illustrate example modifications of controls on a display.
Figure 6D:
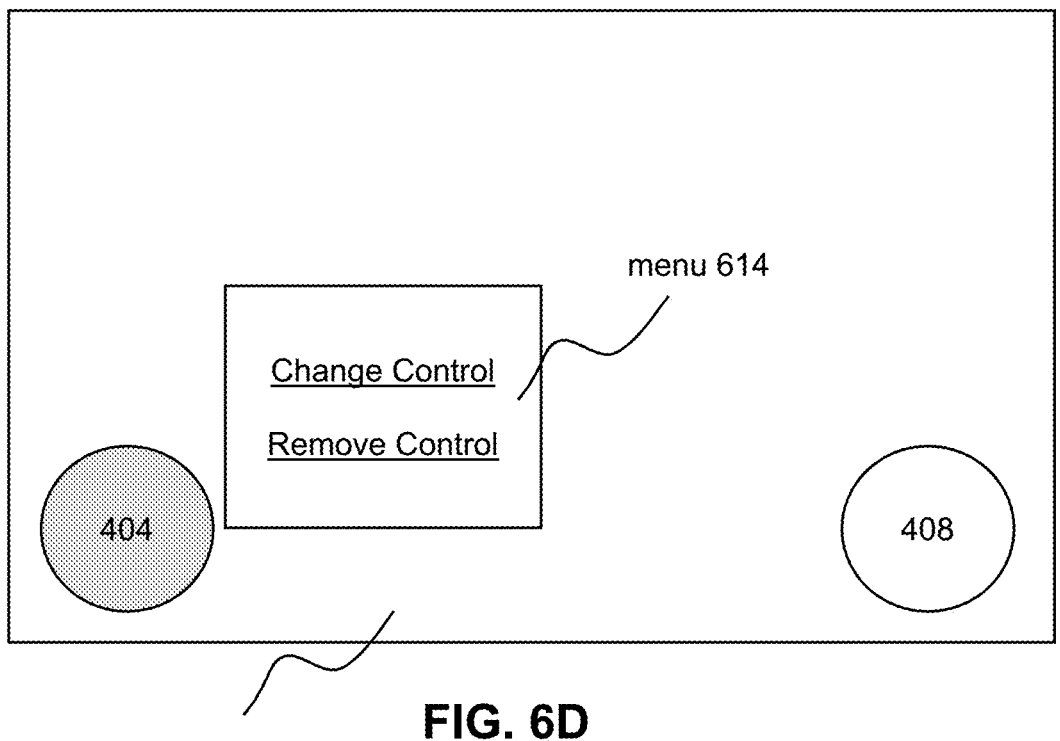
Figure 6E:
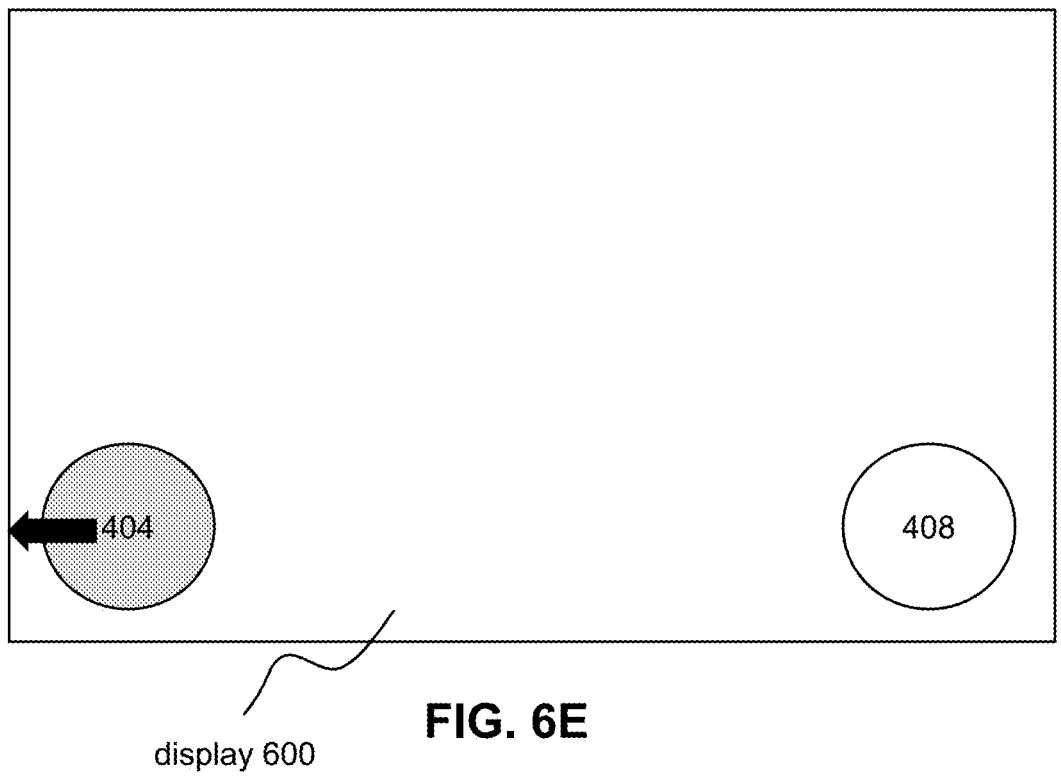

In some implementations, the control customization interface may further include one or more interface features that enables modification of controls presented on the display(s) (a modification feature). The interface feature(s) may enable user to add, create, change, and/or remove a control on the display(s). (69) FIGS. 6C-6E illustrate example modifications of controls on the display 600. In FIG. 6C, an interface feature of the control customization interface may enable a user to select a location 612 (e.g., by holding a finger on the location 612 for a threshold duration of time) (a selection feature). Responsive to the user selection of the location 612, a menu 612 may be presented. The menu 612 may include options that allow a user to add a selectable control to the location 612 and/or to create a control at the location 614.

In FIG. 6D, the controls 404, 408 may be presented on the display 600. An interface feature of the control customization interface may enable a user to select one or more of the controls presented on the display 600. For instance, a user may select the control 404 (e.g., by holding a finger on the control 404 for a threshold duration of time). Responsive to the user selection of the control 404, a menu 614 may be presented. The menu 614 may include options that allow a user to change the control 404 (e.g., to another selectable control) and/or to remove the control 404 from the display 600.

In FIG. 6E, the controls 404, 408 may be presented on the display 600. An interface feature of the control customization interface may enable a user to remove one or more of the controls presented on the display 600. For instance, a user may select the control 404 (e.g., by holding a finger on the control 404 for a threshold duration of time) (a removal feature). After the selection of the control 404, the user may remove the control 404 from the display 600 (remove selection of the control 404 from inclusion in the set(s) of display) by moving the control 404 to an edge of the display 600. In some implementations, the control 404 may be removed from the display 600 based on the user flinging the control 404 to an edge of the display 600. One or more controls may be removed from the display 600 based on movement of the control(s) to other locations of the display 600.

In some implementations, the control customization interface may further include one or more interface features that enables changing one or more appearances on the display(s) of selectable control(s) selected for inclusion in the set(s) of control (a changing feature). That is, the control customization interface may enable a user to change how the selected controls appear on the display(s). The appearance(s) of selectable control(s) selected for inclusion in the set(s) of control may include one or more of an icon, a size, a color, a summary, and/or other visual aspect of selectable control(s) selected for inclusion in the set of control.

An icon of a selected control may refer to a graphical representation of the selected control. The control customization interface may enable a user to select from among predefined icons and/or to create a new icon (e.g., by creating an image of the icon, by uploading an image that is to be used as the icon). A size of a selected control may refer to how large/small the visual representation of the selected control appears on the display(s). The size of the visual representation of the selected control may be defined in terms of pixels (e.g., pixel width, pixel height). The control customization interface may enable the user to define the size of the visual representation of the selected control on the display(s). A color of a selected control may refer to colors included within the visual representation of the selected control. The control customization interface may enable the user to define the colors of the visual representation of the selected control on the display(s).

A summary of a selected control may refer to information that summarizes the image capture device operation effectuated by the selected control. For example, a summary of a time-lapse capture control may describe the parameters (e.g., frame capture rate, the perceived speed increase in the time lapse video) that may be used to capture a time lapse video upon use of the time-lapse capture control. The summary of the selected control may be pretend on the display(s) to provide information on how the image capture device may be operated based on user usage of the selected control The control customization interface may enable a user to define the information that may be included within the summary of the selected control.

In some implementations, the selectable controls may include one or more capture setting controls. A capture setting control may enable usage of one or more capture settings by the image capture device when capturing visual content. For example, a capture setting control may enable a user to select among different capture settings when capturing visual content. A capture setting control may enable a user to use one or more particular capture setting (e.g., toggling on-off a certain capture setting) when capturing visual content. The capture setting of the image capture device may be fixed or changed during a single instance of visual content capture. For example, an image capture device may be limited to using the capture setting in operation when capturing a video. An image capture device may be allowed to use different capture settings while capturing a video (e.g., allow a user to change the capture setting while capturing the video).

A capture setting may define one or more aspects of operation for the image capture device, a processor of the image capture device, an image sensor of the image capture device, an optical element of the image capture device, and/or other components of the image capture device. A capture setting may refer to one or more particular configurations of an image capture device (e.g., the image capture device 302) and/or one or more particular configurations of one or more components of the image capture device (e.g., an optical element, an image sensor, a sound sensor, a processor) used to capture visual content (e.g., visual content of one or more images, visual content of one or more video frames). A capture setting may be static (unchanging) or dynamic (changing) during capture of the visual content. A capture setting may control how the image capture device and/or component(s) of the image capture device operate to capture visual content.

In some implementations, a capture setting may define one or more aspects of operation for an image capture device. One or more aspects of operation for the image capture device may include one or more aspects of operation for one or more processors of the image capture device, one or more image sensors of the image capture device, one or more optical elements of the image capture device, and/or other aspects of operation for the image capture device. A capture setting may define one or more aspects of operation for the image capture device(s) for a time, over a period of time, at a location, or over a range of locations. For example, a capture setting may define particular aspect(s) of operation for an image capture device at a particular point in time, during a particular duration of time, at a particular location, and/or over a particular area.

In some implementations, one or more aspects of operation for the image capture device may include one or more of a capture mode, a capture resolution, a capture framerate, a capture field of view, a capture visual processing, a capture shutter speed, and/or other aspects of operation for the image capture device(s). A capture mode may refer to a pre-defined mode of operation for an image capture device. A capture mode may include manual modes and/or automatic modes. In some implementations, a capture mode may include an automatic capture mode. An image capture device operating in an automatic capture mode may capture visual content (e.g., images, videos) based on detection of particular visuals and/or audio. For example, an image capture device operating in an automatic capture mode may capture video content based on detection of a particular object, a particular action, a particular machine-readable optical code, a particular sound, and/or detection of other things/activity/events. A capture resolution may define the resolution at which visual content is captured. A capture frame rate may define the frame rate at which visual content is captured. A capture field of view may define the extent of an environment observable by an image capture device from a position/orientation. A capture visual processing may define visual manipulation performed by an image capture device during and/or after capture of visual content. A capture shutter speed may define the shutter speed at which visual content is captured. Other aspects of operation for the image capture device(s) are contemplated.

For example, one or more aspects of operation for the image capture device(s) may include single image capture, burst image capture, night lapse capture, image resolution, image framerate, camera field of view, zoom, image projection, image color balance, tonal curve, exposure compensation, color saturation, contrast, sharpening, softening, gamma, ISO limit, video stabilization, shutter speed, encoding parameters (e.g., codec type (H.264, HEVC), I-frame interval, macroblock size, deblocking filter, QP, capture timing (e.g., auto, interval, continuous, loop), and/or other aspects.

In some implementations, one or more aspects of operation for the image capture device(s) may include aspects of operation for one or more microphone/sound sensors of the image capture device(s). For example, one or more aspects of operation for the image capture device(s) may include number of channels, sample rate, compression format (e.g., AAC, MP3), averaging/filter window duration, and/or other aspects.

In some implementations, a capture setting may include one or more conditional aspects of operation for the image capture device(s). For example, a capture setting may define a particular operation to be performed by an image capture device based on occurrence of one or more events. A capture setting may include conditional statements (e.g., If This Then That) that provides for one or more particular operations based on certain conditions. For example, a capture setting may define different capture resolutions and/or frame rates for an image capture device based on the type of visuals the image capture device is configured to capture (e.g., action mode, still mode). One or more particular conditional aspects of operation may be stored as one or more capture modes. Other conditional aspects of operation for the image capture device(s) are contemplated.

In some implementations, the control customization interface may include one or more interface features that creation, modification, and/or removal of one or more capture settings (a capture setting feature). That is, the control customization interface may enable a user to create a capture setting, modify one or more aspects of an existing capture setting, and/or delete an existing capture setting.

Figure 7A:
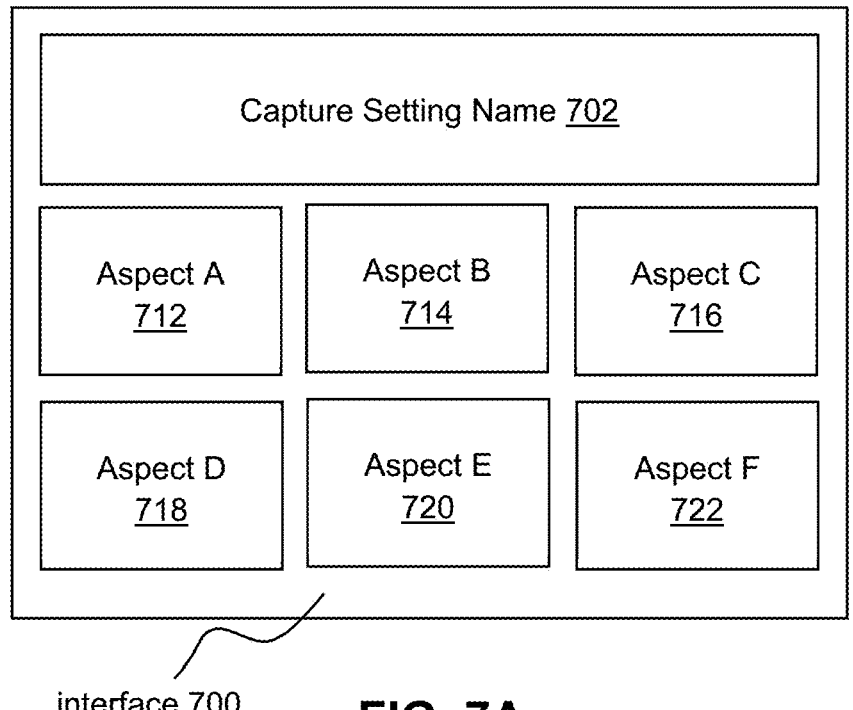
FIGS. 7A-7B illustrate example customizations of a capture setting.
Figure 7B:
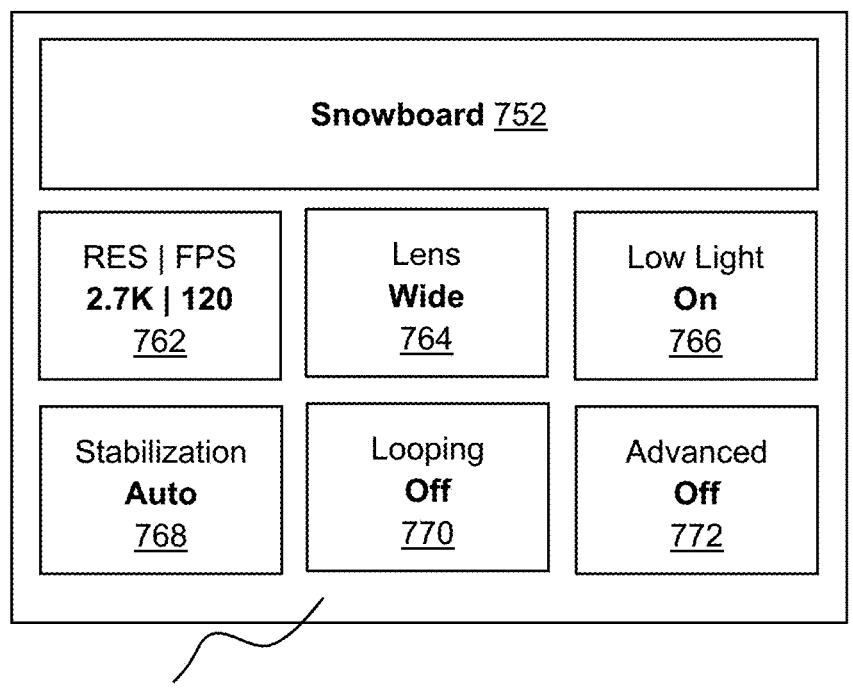

FIGS. 7A-7B illustrate example customizations of a capture setting. In FIG. 7A, an interface 700 may include portions 702, 712, 714, 716, 718, 720, 722. The portion 702 may provide information on a name for a capture setting. A user may interact with the portion 702 to set, modify, and/or remove the name for the capture setting. Individual portions 712, 714, 716, 718, 720, 722 may correspond to different aspects of operation for an image capture. A user may interact with one or more of the portions 712, 714, 716, 718, 720, 722 to set, modify, and/or remove particular aspects of operation for the image capture.

FIG. 7B illustrates an example of different aspects of operation for an image capture defined by a capture setting. In FIG. 7B, an interface 750 may include portions 752, 762, 764, 766, 768, 770, 772. The portion 752 may provide information on a name "Snowboard" for a capture setting. A user may interact with the portion 752 to set, modify, and/or remove the name "Snowboard" for the capture setting. Individual portions 762, 764, 766, 768, 770, 772 may correspond to different aspects of operation for an image capture. A user may interact with one or more of the portions 762, 764, 766, 768, 770, 772 to set, modify, and/or remove particular aspects of operation for the image capture.

For example, the portion 762 may correspond to a resolution and a framerate (frames-per-second) used by the image capture device in capturing visual content. The portion 762 may allow a user to select from among predefined resolutions and/or specify the resolution to be used. The portion 762 may allow a user to select from among predefined framerates and/or specify the framerate to be used. As shown in FIG. 7B, a user may have interacted with the portion 762 to set a resolution of 2.7K and a framerate of 120 FPS to capture visual content.

The portion 764 may correspond to a field of view used by the image capture device in capturing visual content. The portion 764 may allow a user to select from among predefined fields of view and/or specify the field of view to be used. As shown in FIG. 7B, a user may have interacted with the portion 764 to set a Wide field of view to capture visual content.

The portion 766 may correspond to a low light mode of the image capture device in capturing visual content. A low light mode of the image capture device may refer to particular configuration of the image capture device that is tailored for capturing visual content in low light conditions. The portion 766 may allow a user to turn on or off the low light mode of the image capture device. The portion 766 may allow a user to enable the image capture device to control the turning on-off of the low light mode (set to Auto). As shown in FIG. 7B, a user may have interacted with the portion 766 to turn on low light mode.

The portion 768 may correspond to a stabilization mode of the image capture device in capturing visual content. A stabilization mode of the image capture device may refer to processing of the visual content captured by the image capture device to electronic stabilized the visual content. The portion 768 may allow a user to turn on or off the stabilization mode of the image capture device. The portion 768 may allow a user to enable the image capture device to control the turning on-off of the stabilization mode (set to Auto). As shown in FIG. 7B, a user may have interacted with the portion 768 to set the stabilization mode to Auto.

The portion 770 may correspond to a looping mode of the image capture device in capturing visual content. A looping mode of the image capture device may refer to overwriting of a previously recorded visual content to capture new visual content. The looping mode may enable continuous visual content capture (e.g., continuous video recording) by overwriting the beginning of the captured visual content when memory space is running low. The looping mode may cause the image capture device to use memory space as a circular buffer, where the oldest information stored in the memory space is deleted to save newest information. The portion 770 may allow a user to turn on or off the looping mode of the image capture device. As shown in FIG. 7B, a user may have interacted with the portion 770 to turn off the looping mode.

The portion 772 may correspond to an advanced capture setting mode of the image capture device. An advanced capture setting mode may refer to a mode of the image capture device that enables more/greater user-customization of the capture settings of the image capture device. Turning on the advanced capture setting mode may enable a user to customize additional aspects of the image capture device and/or to customization aspects of the image capture device in greater detail. The portion 772 may allow a user to turn on or off the advanced capture setting mode of the image capture device. As shown in FIG. 7B, a user may have interacted with the portion 770 to turn off the advanced capture setting mode.

In some implementations, a capture setting may be stored as a preset on the image capture device. A preset may refer to one or more pre-defined capture settings that may be used by the image capture device. For example, a user may have customized the settings of the image capture device using the interface 750 for capturing visual content of snowboarding. The customized setting of the image capture device may be stored in the image capture device with the name "Snowboard." The user may be able to reconfigure the image capture device to operate in accordance with the customized capture setting of the "Snowboard" preset by activating the preset. In some implementations, a preset may be shared with other users/image capture devices.

Figure 8:
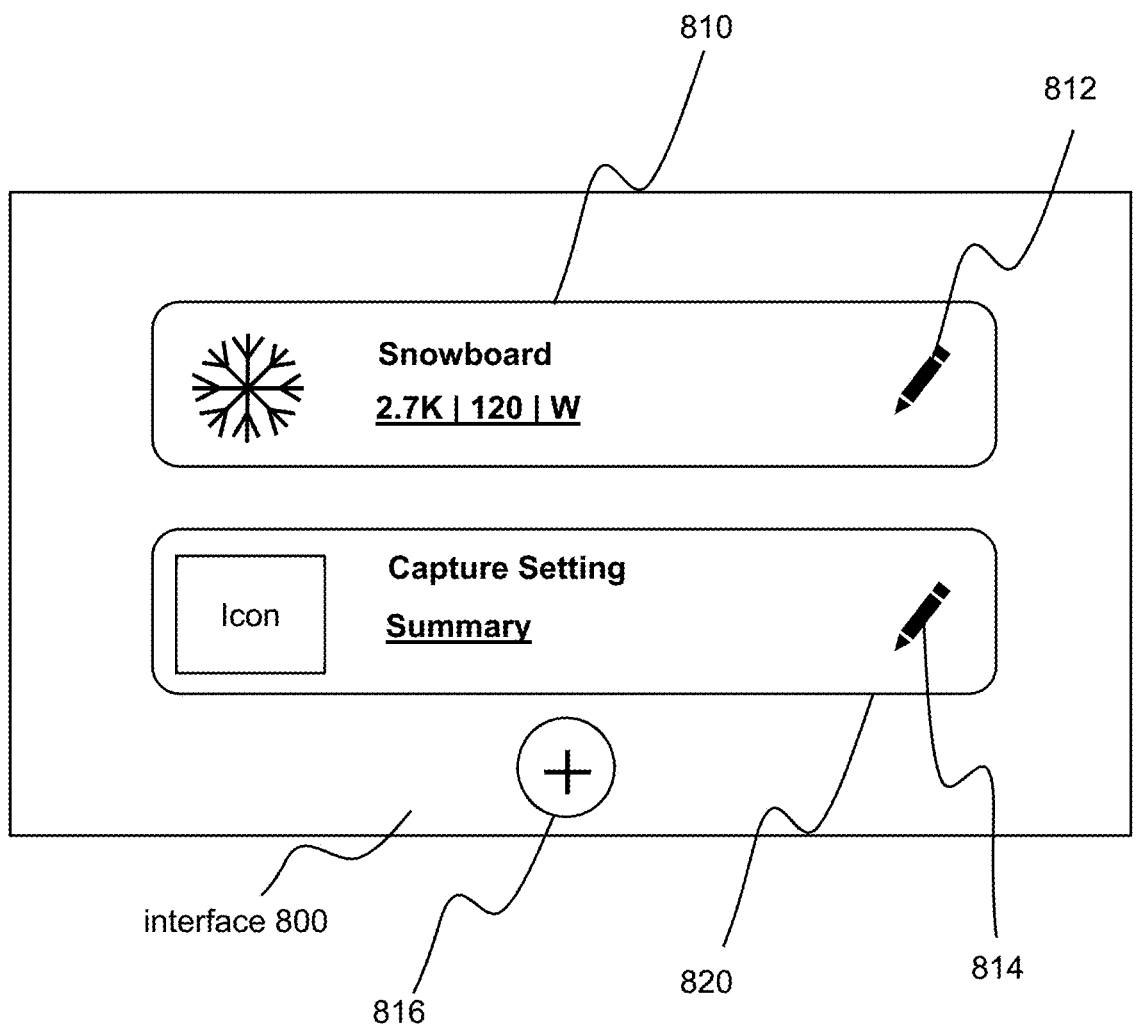
FIG. 8 illustrates an example listing of capture settings.

FIG. 8 illustrates an example listing of capture settings. In FIG. 8, an interface 800 may include the listing of two capture settings. The capture settings presented on the interface 800 may include capture settings stored in an image capture device (e.g., as presets). The listing of the capture settings may include one or more visual representations 810, 820 of the capture settings. For example, the visual representations 810, 820 of the capture settings may include icons corresponding to the capture settings, names corresponding to the capture settings, and summaries corresponding to the capture settings. Other appearances of capture settings are contemplated.

The interface 800 may include options 812, 814. The options 812, 814 may enable a user to modify the capture settings (e.g., change one or more aspects of image capture device operations defined by a capture setting, delete a capture setting). The interface 800 may include an option 816. The option 816 may enable a user to add a new capture setting to the image capture device. Other listings of capture settings are contemplated.

In some implementations, an appearance of a capture setting may be determined based on one or more types of operations defined by the capture setting and/or other information. For example, an icon, a size, a color, a summary, and/or other visual aspect of the capture setting may be determined on what aspects of operation for the image capture device is defined by the capture setting. For instance, an icon generated for a capture setting that defines one or more aspects of operation of an image sensor may be different from an icon generated for a capture setting that defines one or more aspects of the image sensor and one or more aspects of operation of a sound sensor.

As another example, an icon, a size, a color, a summary, and/or other visual aspect of the capture setting may be determined based on the usage scenarios of the capture setting. For instance, an icon generated for a capture setting that defines operation for an image capture device capturing an active sport may be different from an icon generated for a capture setting that defines operation for an image capture device capturing a scenic view at night.

In some implementations, an appearance of a capture setting may be determined based combination of the usage scenarios of the capture setting. The usage scenarios of the capture setting may be differentiated based on timing of visual content capture, light condition of visual content capture, location of visual content capture, and/or the amount of movement during/within visual content capture. For example, capture settings that define operation for an image capture device capturing visual content at night may result in an icon of the capture setting including a graphic representation of night (e.g., an image/shape of moon) while capture settings that define operation for an image capture device capturing visual content at a beach may result in an icon of the capture setting including a graphic representation of beach (e.g., an image/shape of beach). Capture settings that define operation for an image capture device capturing visual content at a beach at night may result in an icon of the capture setting including a graphic representation of night (e.g., an image/shape of moon) and a graphic representation of beach (e.g., an image/shape of beach). Thus, different combinations of graphic representation of usage scenarios may be used to determine (generate) different appearances of capture settings.

The user interaction component 104 may be configured to determine user interaction with the control customization interface. User interaction with the control customization interface may include one or more ways in which a user acts towards, influences, engages, manipulates, and/or otherwise interacts with the control customization interface. A user may interact with the control customization interface through one or more devices. For example, the control customization interface may be presented on a touchscreen display and a user may interact with the control customization interface by interacting with one or more touch-sensitive surfaces/screens of the touchscreen display. The control customization interface may be presented on a display of a computing device and a user may interact with the control customization interface by interacting with one or more input devices, such as a mouse and/or a keyboard of the computing device.

Determining user interaction with the control customization interface may include determining user interaction with and/or via one or more interface features of the control customization interface. For example, user interaction with the control customization interface may be determined based on the user's usage of one or more of the interface feature(s) of the control customization interface. For instance, user interaction with the control customization interface may be determined based on the user's usage of a toggle feature, a drag and drop feature, a positioning feature, a modification feature, a selection feature, a removal feature, a changing feature, a capture setting feature, and/or other features of the control customization interface.

Determining user interaction with the control customization interface may include determining, based on user interaction with and/or via one or more interface features of the control customization interface, which of the selectable controls have been selected by the user for inclusion in one or more sets of controls. User selection of a selectable control for inclusion in a set of controls may include an active selection, a passive selection, an active non-selection, and/or a passive non-selection of the selectable control.

Active selection of a selectable control may include a user actively interacting with the control customization interface to select the selectable control for inclusion in a set of controls (e.g., a user positively identifying a selectable control to be included in the set of controls). A passive selection of a selectable control may include a user's interaction with the control customization interface not changing a pre-selection (e.g., default selection, prior selection) of the selectable control for inclusion in a set of controls (e.g., a user leaving in place pre-selection of a selectable control to be included in the set of controls). Active non-selection of a selectable control may include a user actively interacting with the control customization interface to not/un-select the selectable control for inclusion in a set of controls (e.g., a user positively identifying a selectable control to not be included in the set of controls). A passive non-selection of a selectable control may include a user's interaction with the control customization interface not changing a pre-non-selection (e.g., default non-selection, prior non-selection) of the selectable control for inclusion in a set of controls (e.g., a user leaving in place pre-selection of a selectable control to not be included in the set of controls).

The controls component 106 may be configured to determine the set(s) of controls based the user interaction with the control customization interface and/or other information. Determining a set of controls may include deciding/ascertaining which of the selectable controls are included in the set of controls and/or generating the set of controls to include the selectable controls selected for inclusion in the set of controls. The user interaction with the control customization interface may be used to determine which of the selectable controls have been selected for inclusion in the set(s) of controls and/or which of the selectable controls have not been selected for inclusion in the set(s) of controls. Determining a set of controls may include deciding/ascertaining where the selectable controls are to be included in the set of controls and/or generating the set of controls to include the selectable controls selected for inclusion in the set of controls at selected locations. The user interaction with the control customization interface may be used to determine where the selectable controls are to be included in the set of controls.

The set(s) of controls may include one or more selectable controls indicated by the user interaction to be selected for inclusion in the set(s) of controls, one or more selectable controls indicated by the user interaction to be not selected for exclusion from the set(s) of controls, and/or other selectable controls. The set(s) of controls may not include one or more selectable controls not indicated by the user interaction to be selected for inclusion in the set(s) of controls, one or more selectable controls indicated by the user interaction to be selected for exclusion from the set(s) of controls, and/or other selectable controls.

For example, the set(s) of controls may include a first selectable control based on the user interaction with the control customization interface indicating user selection of the first selectable control for inclusion in the set(s) of controls. The set(s) of controls may not include a second selectable control based on the user interaction with the control customization interface not indicating user selection of the second selectable control for inclusion in the set(s) of controls.

In some implementations, the selection of one or more of the selectable controls for inclusion in the set(s) of controls may be stored as a display mode on the image capture device. A display mode may refer to a pre-defined mode of one or mores sets of controls. A display mode may specify which of the selectable controls are included in the set(s) of controls and/or where the selectable controls are to be located in the set(s) of controls. Usage of a display mode may include presentation of the set(s) of controls including the selectable control(s) previously selected for inclusion in the set(s) of control. That is, a user may store a particular selection of controls for inclusion in the set(s) of controls as a preset, and may cause the set(s) of controls defined by the preset to be presented on the display(s) by using the display mode.

The presentation component 108 may be configured to present the set(s) of controls and/or other information on the display(s). Presenting a set of controls may include presenting the selectable control(s) included in the set of controls on the display(s). Presenting a control on a display may include presenting a visual representation of the control on the display. For example, visual representations of different controls may be presented on the display 400 as shown in FIGS. 4A and 4B. The controls may be presented on a single display (e.g., such as the display 306 shown in FIG. 3) or multiple displays. When the controls are presented on multiple displays, the same or different controls may be presented on different displays.

In some implementations, a preview of visual content may be presented on the display(s). A preview of visual content may refer to a view of the visual content presented during and/or before capture of the visual content. The preview of the visual content may be presented prior to capture of the visual content and/or during the capture of the visual content. For example, an image capture device may be recording a video, and the preview of the video may include a view of the video being recorded. As another example, an image capture device may be being positioned to capture an image of a scene, and the preview of the image may include a view of the scene that is being seen through the image capture device before the image is captured.

In some implementations, the set(s) of controls may be presented within one or more portions of the display(s) while the preview of the visual content may be presented on other portion(s) of the display(s) so that they do not overlap. That is, the set(s) of controls and the preview of the visual content may be presented on different parts of the display(s) so that one does not obstruct the view of the other. In some implementations, the set(s) of controls may be overlaid over the preview of the visual content. The set(s) of controls and the preview of the visual content may occupy the same space on the display(s) so that one is presented over the other. For example, referring to FIG. 4B, the preview of the visual content may be presented on the visible portions of the display 400, and the controls 404, 408 may be overlaid over the lower left and lower right portions of the preview.

The capture component 110 may be configured to capture the visual content based on user interaction with the set(s) of controls and/or other information. Capturing visual content may include recording, storing, and/or otherwise capturing the visual content. For example, based on user interaction with one or more controls included within the set(s) of controls, a visual output signal may be generated by an image sensor of the image capture device and the visual information conveyed by the visual output signal may be used to record, store, and/or otherwise capture the visual content.

The user interaction with the set(s) of controls may include user interaction with one or more controls included within the set(s) of controls. The user interaction with the set(s) of control may be used to determine which of the controls have been used by the user. For example, referring to FIG. 4B, the user interaction with the controls 404, 408 may be used to determine which of the controls 404, 408 have been used by the user. One or more of the controls within the set(s) of controls may be interacted (e.g., engaged by, manipulated by, touched by) on by a user to set and/or change operation of an image capture device at a time, over a duration of time, at a location, and/or over a range of locations. One or more of the controls within the set(s) of controls may be interacted on by a user to operate the image capture device in capturing visual content. Capture of visual content based on user interaction with the set(s) of controls may include capture of the visual content based on user interaction with the set(s) of controls indicating when, where, what, and/or how the visual content should be captured. The user interaction with the interaction with the set(s) of controls may determine how the image capture device and/or how one or more components of the image capture device operates to capture the visual content.

While the description herein may be directed to images and videos, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
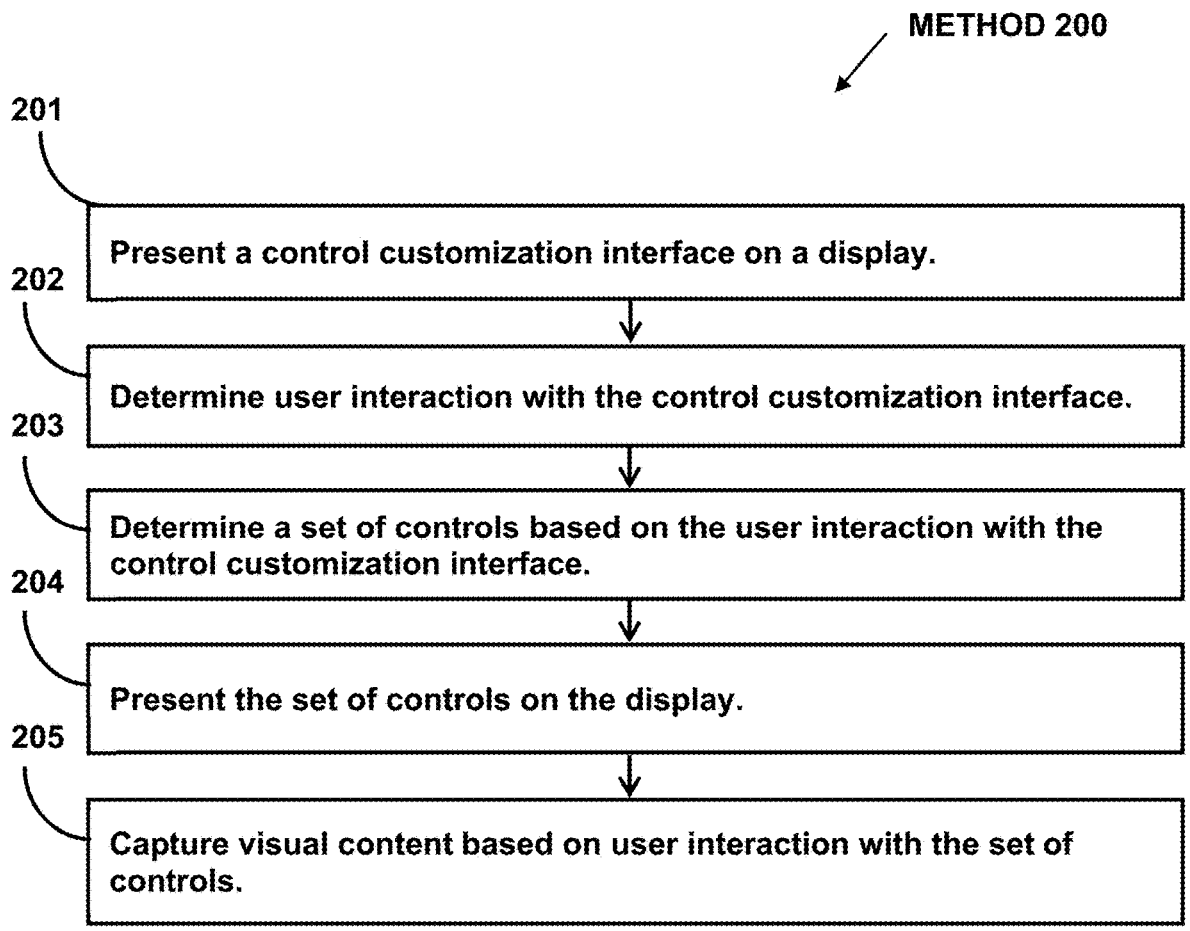
FIG. 2 illustrates an example method for presenting controls for capturing visual content.

FIG. 2 illustrates method 200 for capturing visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, a control customization interface may be presented on a display of an image capture device. The control customization interface may include one or more interface features that enables selection of one or more of selectable controls for inclusion in a set of controls. The selectable controls may include a first selectable control and a second selectable control different from the first selectable control, and/or other selectable controls. In some implementation, operation 201 may be performed by a processor component the same as or similar to the customization component 102 (Shown in FIG. 1 and described herein).

At operation 202, user interaction with the control customization interface may be determined. In some implementation, operation 202 may be performed by a processor component the same as or similar to the user interaction component 104 (Shown in FIG. 1 and described herein).

At operation 203, the set of controls may be determined based the user interaction with the control customization interface. The set of controls may include the first selectable control based on the user interaction with the control customization interface indicating user selection of the first selectable control. The set of controls may not include the second selectable control based on the user interaction with the control customization interface not indicating user selection of the second selectable control. In some implementation, operation 203 may be performed by a processor component the same as or similar to the controls component 106 (Shown in FIG. 1 and described herein).

At operation 204, the set of controls may be presented on the display. In some implementation, operation 204 may be performed by a processor component the same as or similar to the presentation component 108 (Shown in FIG. 1 and described herein).

At operation 205, visual content may be captured based on user interaction with the set of controls. In some implementation, operation 205 may be performed by a processor component the same as or similar to the capture component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device that captures visual content, the image capture device comprising:

a housing;

an optical element carried by the housing and configured to guide light within a field of view to an image sensor;

the image sensor carried by the housing and configured to generate a visual output signal conveying visual information based on light that becomes incident thereon, the visual information defining the visual content having the field of view;

a display carried by the housing and configured to present a set of controls for controlling the capture of the visual content;

one or more physical processors configured by machine-readable instructions to:

present a control customization interface on the display, the control customization interface including portions corresponding to control positions on the display, wherein the portions include a first portion corresponding to a first control position, a second portion corresponding to a second control position, a third portion corresponding to a third control position, and a fourth portion corresponding to a fourth control position, the control customization interface including a first interface feature that enables selection of one or more of selectable controls for inclusion in the set of controls in one or more of the control positions based on user interaction with one or more of the corresponding portions of the control customization interface, the selectable controls including a first selectable control and a second selectable control different from the first selectable control;

determine user interaction with the control customization interface;

determine the set of controls based the user interaction with the control customization interface, wherein the set of controls includes the first selectable control in the first control position based on the user interaction with the first portion of the control customization interface indicating user selection of the first selectable control and does not include any selectable control in the second control position based on the user interaction with the second portion of the control customization interface not indicating user selection of any selectable control;

present the set of controls on the display, the set of controls presented differently on the display than the portions of the control customization interface corresponding to the control positions, wherein visual appearance of the set of controls on the display is different from visual appearance of the portions of the control customization interface corresponding to the control positions; and capture the visual content based on user interaction with the set of controls.

2. The image capture device of claim 1, wherein the first interface feature of the control customization interface that enables the selection of the one or more of the selectable controls for inclusion in the set of controls includes the first interface feature enabling the user to toggle individual ones of the selectable controls between being selected and not being selected for inclusion in the set of controls.

3. The image capture device of claim 1, wherein the first interface feature of the control customization interface that enables the selection of the one or more of the selectable controls for inclusion in the set of controls includes the first interface feature enabling the user to drag and drop the individual ones of the selectable controls onto a selection area to select the individual ones of the selectable controls for inclusion in the set of controls.

4. The image capture device of claim 1, wherein the control customization interface further includes a second interface feature that enables positioning on the display of the one or more selectable controls selected for inclusion in the set of control.

5. The image capture device of claim 4, wherein the control customization interface further includes a third interface feature that enables changing one or more appearances on the display of the one or more selectable controls selected for inclusion in the set of control.

6. The image capture device of claim 1, wherein:
the selectable controls include a capture setting control, the capture setting control enabling usage of a capture setting;
the capture setting defines one or more aspects of operation for the image capture device, a processor of the image capture device, an image sensor of the image capture device, and/or an optical element of the image capture device; and
an appearance of the capture setting is determined based on one or more types of operations defined by the capture setting.

7. The image capture device of claim 1, wherein responsive to a user holding a finger on a given control of the set of controls presented on the display, an option is presented on the display to enable the user to change the corresponding selectable control or to remove the given control from the display.

8. The image capture device of claim 1, wherein:
selection of the one or more of the selectable controls for inclusion in the set of controls is stored with a user-defined preset for the image capture device, the user-defined preset defining one or more pre-defined captured settings selected by the user to be used in capturing the visual content; and
usage of the preset includes presentation of the set of controls including the one or more selectable controls previously selected for inclusion in the set of control and usage of the one or more pre-defined capture settings previously selected for use in capturing the visual content.

9. The image capture device of claim 1, wherein the first control position is an upper-left control position, the second control position is an upper-right control position, the third control position is a lower-right control position, and the fourth control position is a lower-left control position.

10. The image capture device of claim 9, wherein the portions of the control customization interface are presented in a two-by-two grid.

11. A method for capturing visual content, the method performed by an image capture device including one or more processors, an optical element, an image sensor, and a display, the optical element configured to guide light within a field of view to an image sensor, the image sensor configured to generate a visual output signal conveying visual information based on light that becomes incident thereon, the visual information defining the visual content having the field of view, and the display configured to present a set of controls for controlling capture of the visual content, the method comprising:
presenting a control customization interface on the display, the control customization interface including portions corresponding to control positions on the display, wherein the portions include a first portion corresponding to a first control position, a second portion corresponding to a second control position, a third portion corresponding to a third control position, and a fourth portion corresponding to a fourth control position, the control customization interface including a first interface feature that enables selection of one or more of selectable controls for inclusion in the set of controls in one or more of the control positions based on user interaction with one or more of the corresponding portions of the control customization interface, the selectable controls including a first selectable control and a second selectable control different from the first selectable control;
determining user interaction with the control customization interface;
determining the set of controls based the user interaction with the control customization interface, wherein the set of controls includes the first selectable control in the first control position based on the user interaction with the first portion of the control customization interface indicating user selection of the first selectable control and does not include any selectable control in the second control position based on the user interaction with the second portion of the control customization interface not indicating user selection of any selectable control;
presenting the set of controls on the display, the set of controls presented differently on the display than the portions of the control customization interface corresponding to the control positions, wherein visual appearance of the set of controls on the display is different from visual appearance of the portions of the control customization interface corresponding to the control positions; and
capturing the visual content based on user interaction with the set of controls.

12. The method of claim 11, wherein the first interface feature of the control customization interface that enables the selection of the one or more of the selectable controls for inclusion in the set of controls includes the first interface feature enabling the user to toggle individual ones of the selectable controls between being selected and not being selected for inclusion in the set of controls.

13. The method of claim 11, wherein the first interface feature of the control customization interface that enables the selection of the one or more of the selectable controls for inclusion in the set of controls includes the first interface feature enabling the user to drag and drop the individual ones of the selectable controls onto a selection area to select the individual ones of the selectable controls for inclusion in the set of controls.

14. The method of claim 11, wherein the control customization interface further includes a second interface feature that enables positioning on the display of the one or more selectable controls selected for inclusion in the set of control.

15. The method of claim 14, wherein the control customization interface further includes a third interface feature that enables changing one or more appearances on the display of the one or more selectable controls selected for inclusion in the set of control.

16. The method of claim 11, wherein:
the selectable controls include a capture setting control, the capture setting control enabling usage of a capture setting;
the capture setting defines one or more aspects of operation for the image capture device, a processor of the image capture device, an image sensor of the image capture device, and/or an optical element of the image capture device; and
an appearance of the capture setting is determined based on one or more types of operations defined by the capture setting.

17. The method of claim 11, wherein responsive to a user holding a finger on a given control of the set of controls presented on the display, an option is presented on the display to enable the user to change the corresponding selectable control or to remove the given control from the display.

18. The method of claim 11, wherein:
selection of the one or more of the selectable controls for inclusion in the set of controls is stored with a user-defined preset for the image capture device, the user-defined preset defining one or more pre-defined captured settings selected by the user to be used in capturing the visual content; and
usage of the preset includes presentation of the set of controls including the one or more selectable controls previously selected for inclusion in the set of control and usage of the one or more pre-defined capture settings previously selected for use in capturing the visual content.

19. The method of claim 11, wherein the first control position is an upper-left control position, the second control position is an upper-right control position, the third control position is a lower-right control position, and the fourth control position is a lower-left control position.

20. The method of claim 19, wherein the portions of the control customization interface are presented in a two-by-two grid.

* * * * *